United States Patent
Niewels et al.

(10) Patent No.: US 7,950,918 B2
(45) Date of Patent: May 31, 2011

(54) APPARATUS FOR CONTROLLING MELT FLOW IN A MELT DISTRIBUTION NETWORK

(75) Inventors: Joachim Johannes Niewels, Thornton (CA); Tiemo D Brand, North York (CA); Marie-France Sonia Martin, Utopia (CA)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 40 days.

(21) Appl. No.: 12/599,999

(22) PCT Filed: Aug. 24, 2007

(86) PCT No.: PCT/CA2007/001470
§ 371 (c)(1),
(2), (4) Date: Nov. 13, 2009

(87) PCT Pub. No.: WO2009/026667
PCT Pub. Date: Mar. 5, 2009

(65) Prior Publication Data
US 2010/0310694 A1    Dec. 9, 2010

(51) Int. Cl.
*B29C 45/22* (2006.01)
(52) U.S. Cl. ........................................ 425/572
(58) Field of Classification Search .......... 425/564, 425/566, 572
See application file for complete search history.

(56) References Cited

U.S. PATENT DOCUMENTS

| | | | |
|---|---|---|---|
| 4,201,482 A | 5/1980 | Imhauser et al. |
| 4,692,030 A | 9/1987 | Tauscher et al. |
| 4,768,945 A | 9/1988 | Schmidt et al. |
| 4,965,028 A | 10/1990 | Maus et al. |
| 5,421,715 A | 6/1995 | Hofstetter et al. |
| 5,435,711 A | 7/1995 | Yamada |
| 5,564,827 A | 10/1996 | Signer |
| 5,941,637 A | 8/1999 | Maurer |
| 6,077,470 A | 6/2000 | Beaumont et al. |
| 6,090,318 A | 7/2000 | Bader et al. |
| 6,309,208 B1 | 10/2001 | Kazmer et al. |
| 6,382,946 B1 | 5/2002 | Beck et al. |
| 6,503,438 B2 | 1/2003 | Beaumont et al. |
| 6,544,028 B2 | 4/2003 | Wright et al. |
| 6,585,505 B2 | 7/2003 | Kazmer et al. |
| 6,936,199 B2 | 8/2005 | Olaru |
| 6,968,240 B2 | 11/2005 | Frey |

(Continued)

FOREIGN PATENT DOCUMENTS

CA    2461442 A1    9/2005
(Continued)

OTHER PUBLICATIONS

International Search Report of International Application No. PCT/CA2007/001470, 3 pages.

*Primary Examiner* — Tim Heitbrink

(57) ABSTRACT

According to embodiments of the present invention, there is provided an apparatus for controlling melt flow through a portion of the melt distribution network. A flow control device is provided. The flow control device comprises a body defining: a mixer configured to be positioned in a conduit for providing a path of flow for melt such that the mixer traverses substantially the whole cross-section of the path of flow; a temperature control portion associated with the mixer for actively controlling temperature of the mixer.

18 Claims, 6 Drawing Sheets

U.S. PATENT DOCUMENTS

| | | |
|---|---|---|
| 7,196,295 B2 | 3/2007 | Fennewald et al. |
| 7,198,400 B2 | 4/2007 | Unterlander et al. |
| 7,287,977 B2 * | 10/2007 | Serniuck et al. ............... 425/564 |
| 2002/0000685 A1 | 1/2002 | Beaumont et al. |
| 2002/0182285 A1 | 12/2002 | Godwin et al. |
| 2004/0009252 A1 | 1/2004 | Reichstein et al. |
| 2004/0032060 A1 | 2/2004 | Yu |
| 2004/0113303 A1 | 6/2004 | Frey |
| 2004/0115294 A1 | 6/2004 | Moran et al. |

FOREIGN PATENT DOCUMENTS

| | | |
|---|---|---|
| EP | 0546554 | 3/1997 |
| JP | 2003340896 | 12/2003 |
| WO | 9319862 A1 | 10/1993 |
| WO | 2005053826 A2 | 6/2005 |

* cited by examiner

APPARATUS FOR CONTROLLING MELT FLOW IN A MELT DISTRIBUTION NETWORK

FIELD OF THE INVENTION

The present invention generally relates to, but is not limited to, molding systems, and more specifically the present invention relates to, but is not limited to, an apparatus for controlling melt flow in a melt distribution network.

BACKGROUND OF THE INVENTION

Molding is a process by virtue of which a molded article can be formed from molding material. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

A typical molding system includes an injection unit, a molding machine and a mold assembly. The injection unit can be of a reciprocating screw type or of a two-stage type. The molding machine includes inter alia a frame, a movable platen, a fixed platen and an actuator for moving the movable platen and to apply tonnage to the mold assembly arranged between the platens. The mold assembly includes inter alia a cold half and a hot half. The hot half is usually associated with one or more cavities (and, hence, also sometimes referred to by those of skill in the art as a "cavity half"), while the cold half is usually associated with one or more cores (and, hence, also sometimes referred to by those of skill in the art as a "core half"). The one or more cavities together with one or more cores define, in use, one or more molding cavities. The hot half can also be associated with a melt distribution system (also referred to sometimes by those of skill in the art as a "hot runner") for melt distribution. The mold assembly can be associated with a number of additional components, such as neck rings, neck ring slides, ejector structures, wear pads, etc.

As an illustration, injection molding of PET material involves heating the PET material (ex. PET pellets, PEN powder, PLA, etc.) to a homogeneous molten state and injecting, under pressure, the so-melted PET material into the one or more molding cavities defined, at least in part, by the aforementioned one or more cavities and one or more cores mounted respectively on a cavity plate and a core plate of the mold assembly. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core. Accordingly, by urging the core plate away from the cavity plate, the molded article can be demolded, i.e. ejected from the core piece. Ejection structures are known to assist in removing the molded articles from the core halves. Examples of the ejection structures include stripper plates, ejector pins, etc.

U.S. Pat. No. 6,309,208 issued to Kazmer, et al. on Oct. 30, 2001 discloses an injection molding machine having first and second nozzles for delivering melt material from a common manifold to one or more mold cavities, apparatus for controlling delivery of the melt material from the nozzles to the one or more mold cavities, each nozzle having an exit aperture communicating with a gate of a cavity of a mold and being associated with an actuator interconnected to a melt flow controller, the apparatus comprising: a sensor for sensing a selected condition of the melt material through at least one of the nozzles; and, an actuator controller interconnected to each actuator, at least one actuator controller comprising a computer interconnected to the sensor for receiving a signal representative of the selected condition sensed by the sensor, the computer including an algorithm utilizing a value corresponding to a signal received from the sensor as a variable for controlling operation of an actuator for the at least one nozzle.

U.S. Pat. No. 6,544,028 issued to Wright et al. on Apr. 8, 2003 discloses a mixer method and apparatus for use generally in injection molding machines is provided. The apparatus and method is generally comprised of a mixer insert that retains a mixing element that is sealingly inserted in the injection molding machine, for example a hot runner manifold. The mixing element reduces the melt imbalances in a flowing melt stream for the formation of improved molded parts.

U.S. Pat. No. 4,692,030 issued to Tauscher et al. on Sep. 8, 1987 discloses a static mixing device includes a tubular casing and at least one mixing element composed of individual webs which are secured in the wall of the casing. The webs are disposed in crossing relation to each other with a transverse spacing therebetween. The terminal ends of each web are secured within the wall of the casing by being shrink-fitted, soldered, welded or threaded.

U.S. Pat. No. 5,421,715 issued to Hofstetter et al. on Jun. 6, 1995 discloses an apparatus for the simultaneous production of preforms consisting of polyethylene terephthalate (PET) fed and distributed to a plurality of cavities. In order to reduce the occurrence of acetaldehyde formation in a cavity, for example, a heated distributor block used in the production of preforms of the PET material, the material flowing through a channel is subjected to additional turbulence. To this end, an element, preferably of metal, is installed in the channels, such element being provided with sets of radial spokes which are azimuthally offset in relation to each other in the axial direction. Besides inducing turbulence, such spokes act as homogenizing elements serving to diffuse heat over the cross section of the flowing process material.

U.S. Pat. No. 5,564,827 issued to Signer on Oct. 15, 1996 discloses a device for the homogenization of high-viscosity fluids comprises static mixing elements and possibly filter elements. These elements of the device are arranged in a sleeve along the sleeve axis. According to the invention the sleeve is composed of several parts; the elements of the device are monolithic structural members and all or a plurality of these structural members have flange-like or nose-like parts. With these parts the structural members engage so as to anchor in the sleeve region between sleeve parts and form, at the same time, parts of the sleeve. The device according to the invention is provided, for instance, as a mixing head in the nozzle of an injection molding machine or as a melt mixer of an extruder.

U.S. Pat. No. 5,941,637 issued to Maurer on Aug. 24, 1999 discloses a flow forming member for a polymer melt comprises an inlet point as well as an outlet point, a tubular channel connecting these points and a rod-like body arranged along the channel axis. At least one static mixing element is arranged in the channel, preferably at least two static mixing elements are arranged one after the other. The mixing elements have apertures for the accommodation of the rod-like body. A firm connection exists between the body and the mixing elements. A minimum gap is provided between the mixing elements and the channel wall which permits a displacement of the body in the channel or an insertion into the channel.

U.S. Pat. No. 4,201,482 issued to Imhauser et al. on May 6, 1980 discloses a mixing insert of solid material into which intersecting channels are drilled is particularly suitable for use as a static mixer for highly viscous liquids. The insert provides a high quality of mixing while withstanding pressure differences of more than $10^7$ Pa along the mixer. If the insert is rotated, static and dynamic mixing properties are superimposed on each other in the mixer. Either forward transport of the materials or return for remixing can be particularly promoted according to the sense of rotation and form of the external channels, which must be partly open.

U.S. Pat. No. 6,503,438 issued to Beaumont et al. on Jan. 7, 2003 discloses a tool structure or tool insert has a runner system which includes at least one branching runner which branches in at least two directions forming at least a first pair of branch runners for receiving laminar flowing material for the formation of a product. Each branch runner is at a position in the runner system such that it receives material having significantly similar conditions from side-to-side of a bisecting plane of that runner which bisects the cross section of at least a portion of the length of that branch runner. This material also has dissimilar conditions from side-to-side of a perpendicular plane of each branch runner which is perpendicular to the bisecting plane of that runner with the perpendicular plane of each branch runner also bisecting the cross section of the same portion of the length of each branch runner that the bisecting plane bisects. A repositioner in the tool or tool insert repositions the dissimilar conditions of the laminar flowing material to preselected positions in circumferential directions around the center of the flow paths of each runner of each pair of branch runners. Each pair of branch runners is joined at a location on each runner of each pair which causes the flow from each of these runners to form a half of a joint stream of material which has conditions across its flow path that are significantly balanced from side-to-side of two perpendicular planes which bisect the flow path of the joint stream.

U.S. Pat. No. 6,382,946 issued to Beck et al. on May 7, 2002 discloses a multi-cavity coinjection mold and method for simultaneously producing a plurality of multi-layered articles comprising: a mold structure defining a plurality of mold cavities; a first supply source for supplying metered amounts of a first molding material; a second supply source for supplying metered amounts of a second molding material; a hot runner system in communication with the first and second supply sources for conveying the metered amounts of the first and the second materials separately to a region proximate each of the cavities; the region comprising having a pin controlled passage leading to proximate cavity by way of a gate having the same cross-section as the passage, the pin scavenging material from the passage and providing cavity packing.

European patent 0 546 554 published on Mar. 19, 1997 discloses a hot tip gated injection molding apparatus having a heated manifold to distribute melt to a number of spaced gates. An unheated sealing and conductive member is mounted directly between the heated manifold and the cooled cavity plate in alignment with each gate. The sealing and conductive member has an elongated hot tip shaft which is connected to extend centrally through the bore of an outer collar portion by a number of spaced spiral blades. The collar portion bridges an insulative air space between the hot manifold and cooled cavity plate to prevent melt leaking into it. Heat received through the rear end of the collar portion which abuts directly against the heated manifold is transferred through the blades and the hot tip shaft to the gate area which is aligned with the pointed forward end of the hot tip shaft. The rear end of the hot tip shaft extends rearwardly into a branch of the melt passage to pick up heat from the surrounding melt. The hot tip shaft has a highly conductive inner portion inside an abrasion resistant outer portion to conduct heat to and away from the gate area during different parts of the injection cycle. The spiral blades impart a swirling motion to the melt which flows between them.

U.S. Pat. No. 6,077,470 issued to Beaumont on Jun. 20, 2000 discloses a method of balancing the flow of a molten polymer containing material in a multi-runner injection mold includes the step of providing a mold body having at least one mold cavity and at least two runners. The first runner includes first and second ends and is connected to a source of molten material. The first runner is connected to a second runner. The second runner is connected to the at least one mold cavity. A stream of a molten polymer containing material flows through the first and second runners. The stream is repositioned in a circumferential direction as it flows from the first runner through the second runner while maintaining continuity between laminates of the stream of the molten material in a radial direction. In this way, a balance is provided for the melt temperatures and material properties of the cross branching runners. An apparatus for producing molded products having balanced thermal, material and flow properties includes a device for repositioning a stream of the molten polymer containing material as it flows from a first runner into at least a second downstream runner. If desired, the stream of molten thermoplastic material can be repositioned by approximately 90 degrees.

U.S. Pat. No. 7,198,400 issued to Unterlander et al. on Apr. 3, 2007 discloses a static mixer comprising a mixer body with a first and a second array of intermeshed and interconnecting passageways formed therein that connect, and provide a convoluted flow path between, flow faces at ends of the mixer body. The first and second arrays of passageways preferably interconnect such that the boundaries of adjacent intermeshed passageways overlap to form mixing portals. When used in an injection molding system, a singular melt flow is initially divided at the first flow face of the static mixer, wherein the melt flow divides into the intermeshing passageways and further divides and re-combines at the locations of mixing portals before exiting the static mixer at the second flow face as homogenized melt.

Japanese patent application 2003340896 assigned to Meiki Co LTD and published on Dec. 2, 2003 discloses aims to provide a method which does not need an external heater, directly heats a molten material, allows for injection-molding of a conductive thin wall article at a relatively low injection pressure, and improves the fluidity of the molten material during injection-packing and an apparatus for the method. To that extent there is provided a solution which involves, when the molten material in an injection molding machine for injection-molding the molten conductive material is heated, in a passage with a channel in a nozzle in which the molten material to be packed in a mold cavity flows expanded and formed, an electrode having a cross-sectional shape resembling that of the passage and an cross-sectional area smaller than that of the passage is suspended by terminals to form a uniform clearance between the passage and the electrode. Power is supplied from a power supply to the electrode and the nozzle through the terminals to heat the molten material by resistance heating.

SUMMARY OF THE INVENTION

According to a first broad aspect of the present invention, there is provided a flow control device comprising a body defining: a mixer configured to be positioned in a conduit for providing a path of flow for melt such that the mixer traverses substantially the whole cross-section of the path of flow; a temperature control portion associated with the mixer for actively controlling temperature of the mixer.

According to a second broad aspect of the present invention, there is provided a melt distribution network comprising a network of runners for providing a path of flow between a melt inlet and a plurality of melt outlets; a flow control device disposed within a portion of the network of runners, the flow control device comprising a body defining: a mixer configured to be positioned within the portion of the network of runners such that the mixer traverses substantially the whole cross-section of the path of flow; a temperature control portion associated with the mixer for actively controlling temperature of the mixer.

DESCRIPTION OF THE DRAWINGS

A better understanding of the embodiments of the present invention (including alternatives and/or variations thereof) may be obtained with reference to the detailed description of the embodiments along with the following drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 1:
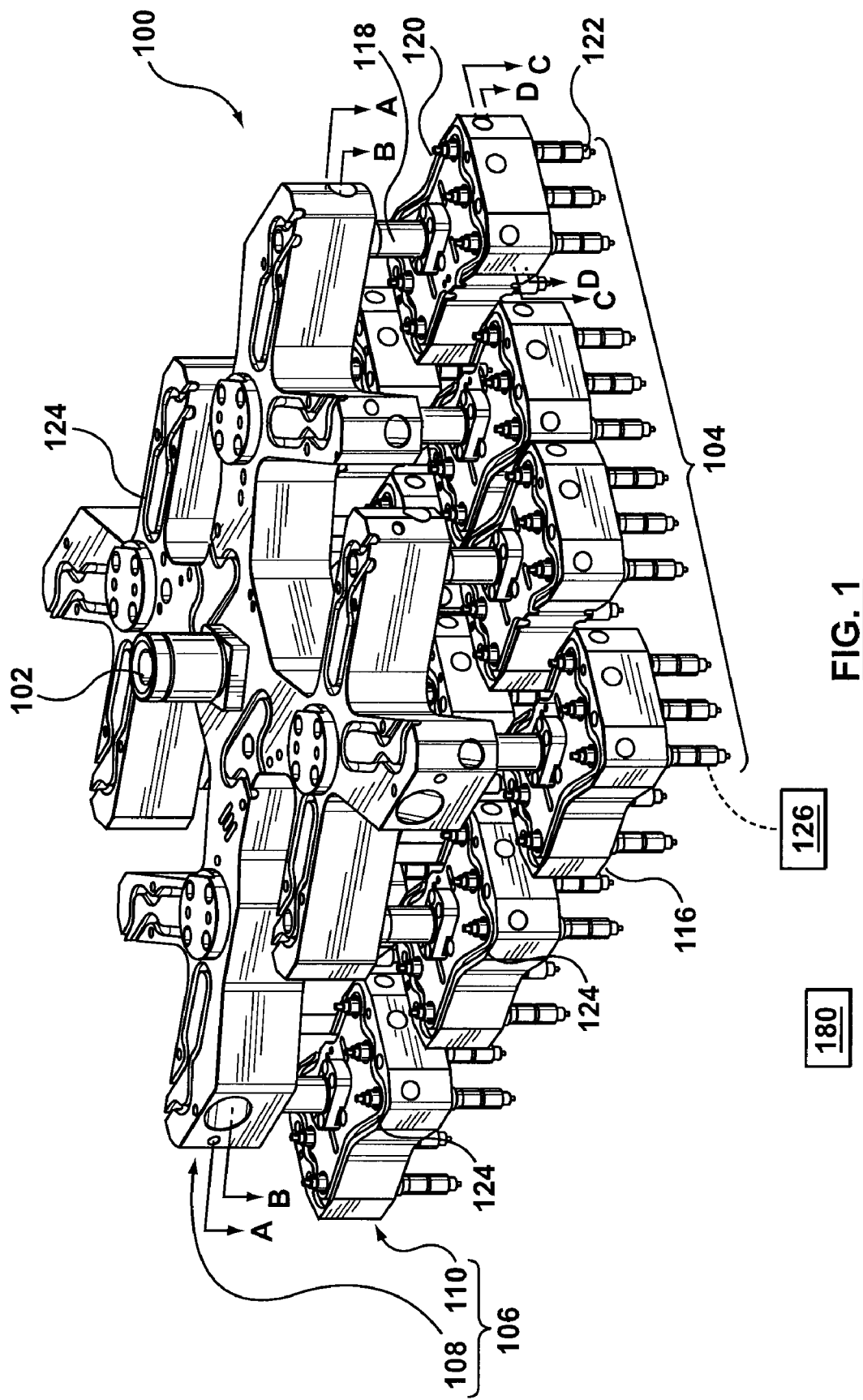
FIG. 1 depicts a perspective schematic view of a melt distribution network according to a non-limiting embodiment of the present invention.

FIG. 1 depicts a schematic representation of a melt distribution network 100 that can be adapted to implement embodiments of the present invention. The melt distribution network 100 is typically embedded in one or more plates (not depicted) and sometimes referred to by those of skill in the art as a "hot runner". The melt distribution network 100 of FIG. 1 can be used as part of a mold (not depicted) that is used in an injection molding machine that is configured to process PET material into preforms capable of being subsequently blow-molded into beverage containers. However, in other embodiments of the present invention, the melt distribution network 100 can be part of other types of molds (not depicted) that can be used in other types of molding machines, such as thinwall molding machines, closures molding machines, molding machines using other types of materials (such as, for example, Thixomolding machines) and the like.

The melt distribution network 100 comprises a melt inlet 102 and a plurality of melt outlets 104. The melt inlet 102 is also referred to by those of skill in the art as a "sprue bushing" and is configured to cooperate, in use, with a machine nozzle (not depicted) to provide a point of entry for the melt flow into the melt distribution network 100. As those skilled in the art will appreciate, the melt inlet 102 cooperates with the machine nozzle (not depicted) to provide effective sealing to substantially prevent any spillage of the melt.

Each of the plurality of melt outlets 104 will be referred to herein below as a melt outlet 104, however, those of skill in the art sometimes also refer to the melt outlet 104 as a "drop". Each of the plurality of melt outlets 104 is configured to cooperate, in use, with a molding cavity (not depicted) defined between cooperating mold core (not depicted) and mold cavity (not depicted) to provide a point of exit for the melt from the melt distribution network 100. Even though not visible in FIG. 1, each of the plurality of melt outlets 104 defines an internal flow channel (not depicted) for the melt and terminating at an orifice (not separately numbered) of a nozzle tip 122.

In the specific non-limiting embodiment depicted in FIG. 1, each of the plurality of melt outlets 104 is also associated with a valve stem 120 disposed, at least partially, within the internal flow channel (not depicted). The valve stem 120 is actuatable between a closed position and an open position. In the closed position, the valve stem 120 substantially obstructs the orifice (not separately numbered) associated with the nozzle tip 122 to substantially prevent flow of the melt. In the open position, the valve stem 120 substantially un-obstructs the orifice (not separately numbered) associated with the nozzle tip 122 to allow for the melt to flow. Even though not shown in FIG. 1, the valve stem 120 can be actuated by any known actuator, such as piston-type actuators and the like. In alternative non-limiting embodiments of the present invention, the nozzle tip 122 can be "thermally gated" and within those embodiments of the present invention, the valve stem 120 (and the associated actuators) can be omitted.

The melt inlet 102 is fluidly coupled to the plurality of melt outlets 104 via a network of runners 106. In the specific non-limiting embodiments depicted with reference to FIG. 1, the network of runners 106 comprises a first level sub-network 108 and a second level sub-network 110. The first level sub-network 108 is fluidly coupled to the melt inlet 102.

Figure 2B:
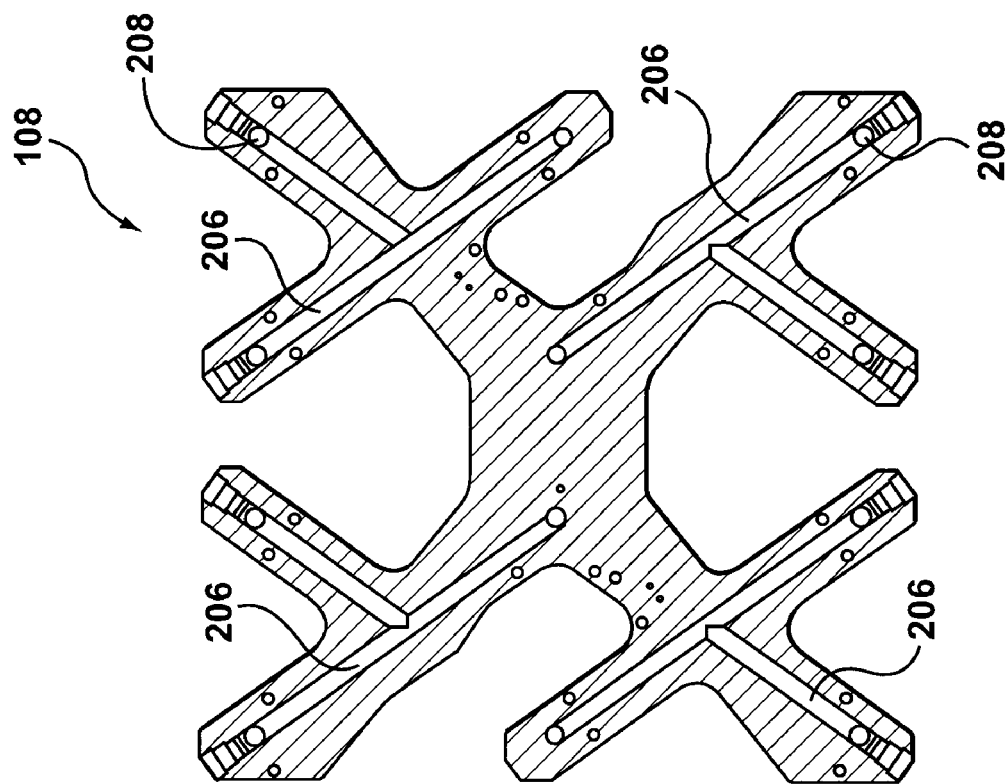
FIGS. 2A and 2B depict cross sections taken though a first level sub-network of FIG. 1 depicting a first level main distribution runner and a first level secondary distribution runner, respectively.
Figure 2A:
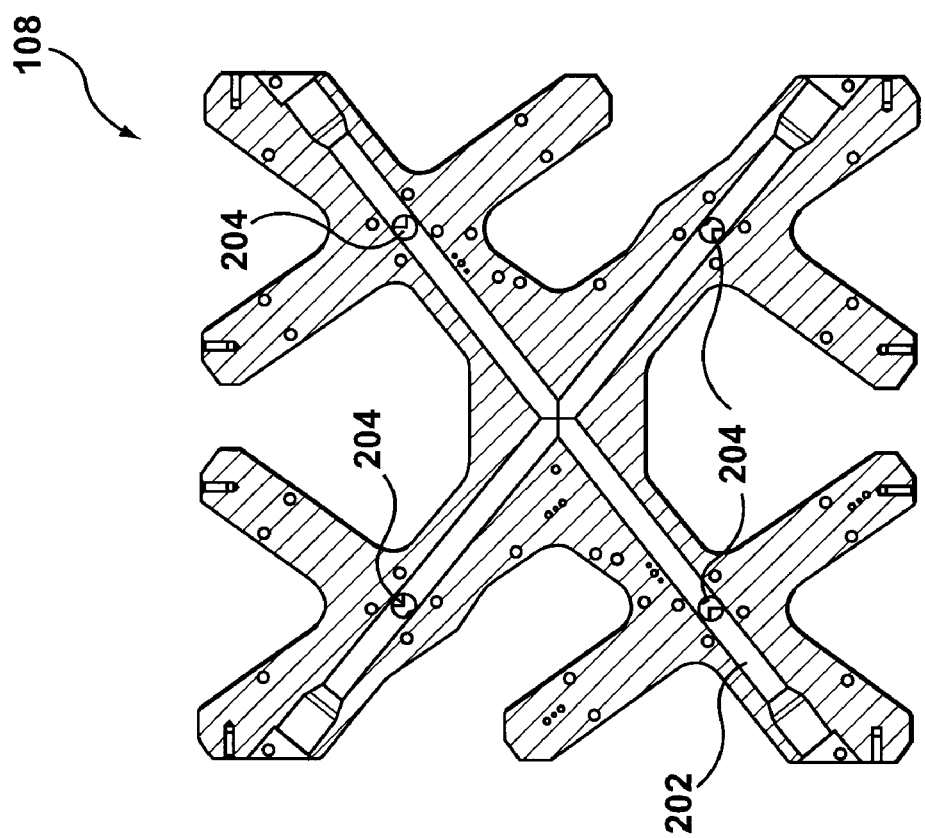

Brief reference is now made to FIG. 2A and FIG. 2B, which depict a respective cross-section through the first level sub-network 108 of FIG. 1 taken through lines A-A and B-B respectively. Within the specific non-limiting embodiment depicted in FIG. 2A, the first level sub-network 108 comprises a first level main distribution runner 202, which is generally X-shaped. The first level main distribution runner 202 can be produced by known techniques, such as drilling and the like. The first level main distribution runner 202 comprises a plurality of fluid connectors 204. Each of the plurality of fluid connectors 204 couples the first level main distribution runner 202 to a respective one of a first level secondary distribution runner 206 (depicted in FIG. 2B). Each of the first level secondary distribution runners 206 is generally Y-shaped. The first level secondary distribution runners 206 can be produced by known techniques, such as drilling and the like. Each of the "Y" branches of the first level secondary distribution runners 206 comprises a coupling interface 208 for accepting, in use, the coupler 118.

It should be explicitly understood that FIG. 2A and FIG. 2B show just one non-limiting example of how the first level main distribution runner 202 and the first level secondary distribution runners 206 can be implemented. Other implementations (configurations, location, number of layers, etc.) are also possible.

Returning to the description of FIG. 1, in the specific non-limiting embodiment depicted in FIG. 1, the second level sub-network 110 comprises twelve (12) instances of a second level distributor 116. Each of the twelve instances of the second level distributor 116 is coupled to the first level sub-network 108 via a coupler 118. In some embodiments of the present invention, the coupler 118 is implemented as a transition bushing, which is implemented as an elongated tubular body.

Figure 2D:
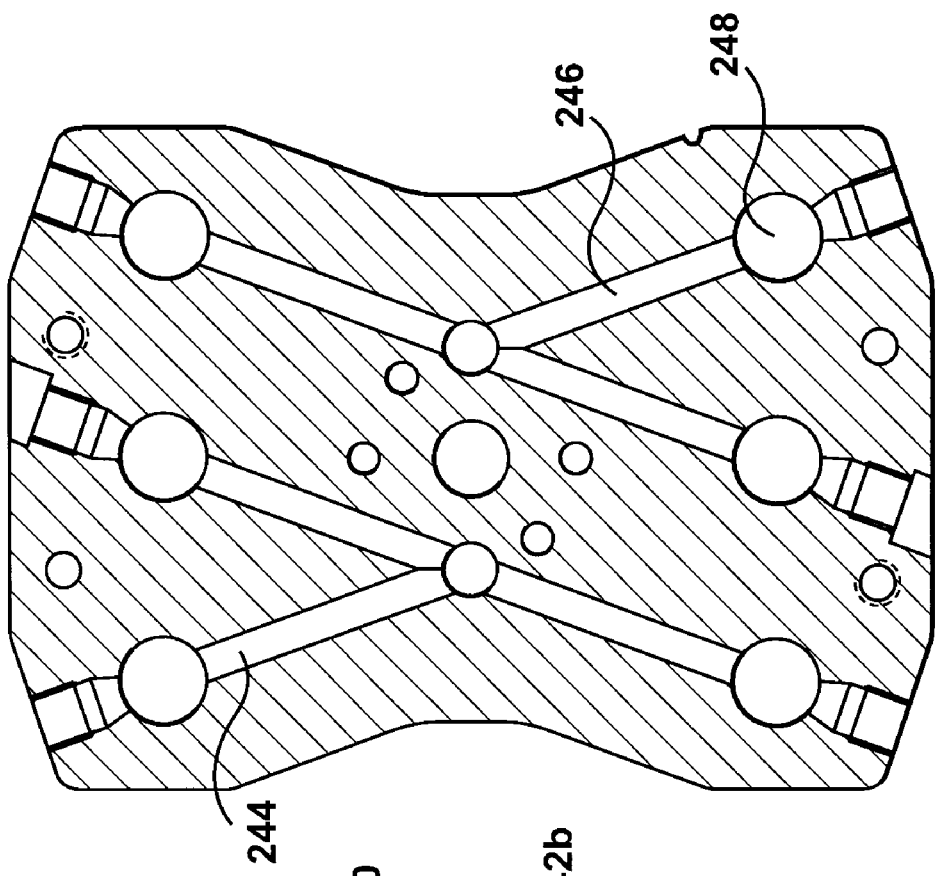
FIGS. 2C and 2D depict cross sections taken through a second level distributor of a second level sub-network of FIG. 1 and depicting a second level main distribution runner and a second level secondary distribution runner, respectively.
Figure 2C:
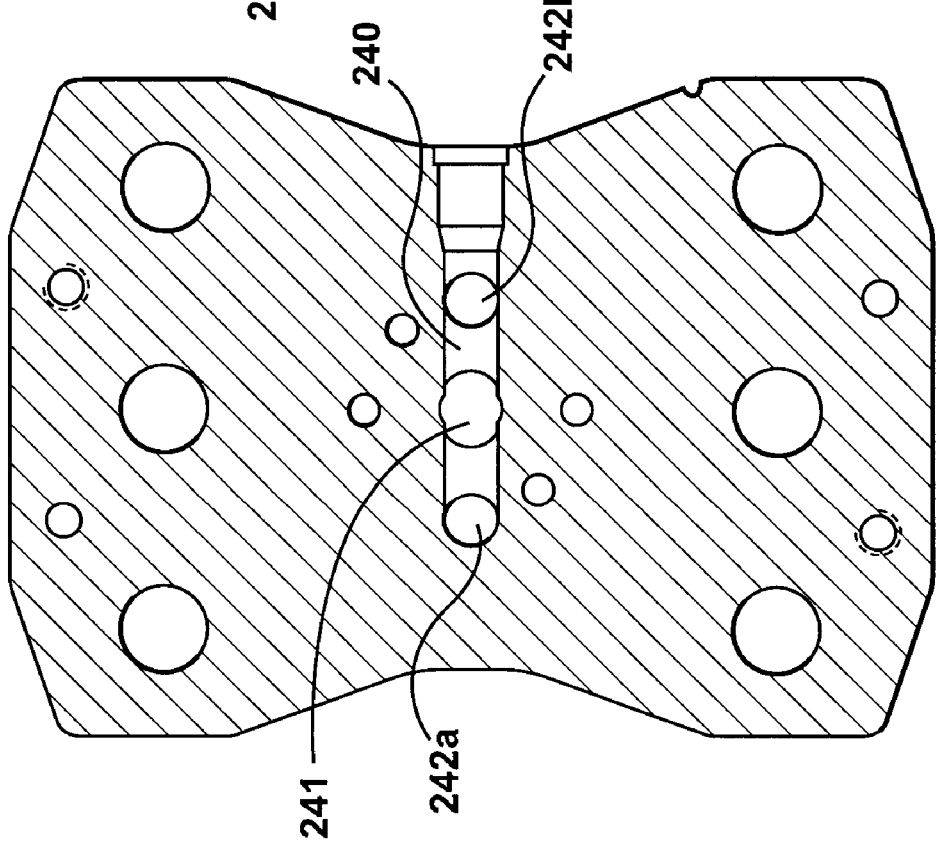

Brief reference is now made to FIG. 2C and FIG. 2D, which depict a respective cross-section through the second level distributor 116 of FIG. 1 taken through lines C-C and D-D respectively. Within the specific non-limiting embodiment depicted in FIG. 2C, the second level distributor 116 comprises a second level main distribution runner 240. The second level main distribution runner 240 can be produced by known techniques, such as drilling and the like.

The second level main distribution runner 240 comprises a coupling interface 241 for accepting, in use, the coupler 118. The second level main distribution runner 240 further comprises a pair of fluid connectors—a fluid connector 242*a* and a fluid connector 242*b*. The fluid connector 242*a* couples the second level main distribution runner 240 to a second level secondary distribution runner 244 (depicted in FIG. 2D) and the fluid connector 242*b* couples the second level main distribution runner 240 to a second level secondary distribution runner 246 (depicted in FIG. 2D). It can be seen that the second level secondary distribution runner 244 and the second level secondary distribution runner 246 are substantially mirror images (i.e. rotated images) of each other and are generally Y-shaped. The second level secondary distribution runner 244 and the second level secondary distribution runner 246 can be produced by known techniques, such as drilling and the like. It should be explicitly understood that FIG. 2C and FIG. 2D show just one non-limiting example of how the second level main distribution runner 240, the second level secondary distribution runner 244 and the second level secondary distribution runner 246 can be implemented. Other implementations (configurations, location, number of layers, etc.) are also possible.

Also shown in FIG. 2C and FIG. 2D is a plurality of receptacles 248 for receiving in use, therethrough, a respective melt outlet 104. The plurality of receptacles 248 are also configured to provide a path of flow between the second level secondary distribution runner 244 and the second level secondary distribution runner 246 to the aforementioned internal flow channel of each of the plurality of melt outlets 104.

Returning to the description of FIG. 1, there is also provided a plurality of heater receptacles 124, only some of which are numbered in FIG. 1 for the sake of ease of illustration. More specifically, some of the plurality of heater receptacles 124 are located in the first level sub-network 108 and some of the plurality of heater receptacles 124 are located in the second level sub-network 110.

The plurality of heater receptacles 124 is configured to accept, in use, a plurality of heaters (not depicted) that are configured to provide heating to maintain a target temperature associated with the melt flowing via (i) the first level main distribution runner 202 and the first level secondary distribution runner 206 of the first level sub-network 108, and (ii) the second level main distribution runner 240 and the second level secondary distribution runner 244 and/or the second level secondary distribution runner 246 of the second level sub-network 110.

In some embodiments of the present invention, all of the heaters received in all of the plurality of heater receptacles 124 can be controlled in unison. In other embodiments of the present invention, the heaters received in all of the plurality of heater receptacles 124 can be divided into so-called "control zones", the heaters in a given control zone being controlled in unison therebetween, but separately from heaters disposed in another control zone. Configuration of the plurality of heater receptacles 124 and heaters receivable therein is known to those of skill in the art and, as such, does not need to be discussed here at any length.

Also provided in FIG. 1 is a sensor 126. In some embodiments of the present invention, the sensor 126 may comprise a plurality of sensors 126. The sensor 126 can be embodied in any suitable sensor to detect an operating parameter. Examples of suitable implementation for the sensor 126 include, but are not limited to: (i) a thermocouple for measuring operating temperature (for example, temperature of the melt); (ii) a pressure gauge for measuring operating pressure within the melt stream; (ii) a flow measuring device for directly or indirectly measuring the rate of flow pass the flow measuring device and the like. Naturally, other types of the sensor 126 for measuring these or other operating parameters can be used.

Each of the plurality of sensors 126 can be associated directly or indirectly with each of the couplers 118. For example, the sensor 126 can be installed within the coupling 118 or substantially proximate thereto. Alternatively, the sensors 126 can be positioned in such a way that they provide a reading of a sensed parameter that is representative of an operational parameter of each of the couplers 118.

Within the architecture depicted in FIG. 1, there is also provided a computing apparatus 180. The computing apparatus 180 can be configured to control one or more operation of the molding system (not depicted) that incorporates the melt distribution network 100.

The computing apparatus 180 can be implemented as part of a controller that controls various operations of the molding system (not depicted) that incorporates, in use, the melt distribution network 100. Alternatively, the computing apparatus 180 can be implemented as a separate computing device configured to control only certain operations or operations of a certain component of the molding system (not depicted) that incorporates, in use, the melt distribution network 100. In yet further non-limiting embodiments of the present invention, the computing apparatus 180 may be implemented as a dedicated computing device for implementing embodiments of the present invention. An example of functions that can be performed by the computing apparatus 180 include, but are not limited to, receiving data from the sensor 126, as well as other functions to be described in greater detail herein below.

It should be noted that FIG. 1 depicts just one possible architecture for the melt distribution network 100. It should be expressly understood that various other alternative embodiments are possible. Just as an example of an alternative non-limiting embodiment, reference is now made to FIG. 3, which depicts another non-limiting embodiment of a melt distribution network 100*a*. The melt distribution network 100*a* can be substantially similar to the melt distribution network 100, but for the specific differences discussed herein below and, as such, like elements are depicted with like numerals. Similarly to the melt distribution network 100, the melt distribution network 100a comprises the melt inlet 102, as well as a plurality of melt outlets, which are omitted from FIG. 3 for the sake of simplicity.

The melt distribution network 100a comprises a network of runners 106a. In the specific non-limiting embodiments depicted with reference to FIG. 3, the network of runners 106a comprises a first level sub-network 108a and a second level sub-network 110a. The first level sub-network 108a is fluidly coupled to the melt inlet 102. Within these embodiments of the present invention, the first level sub-network 108a is generally "H-shaped".

Figure 3:
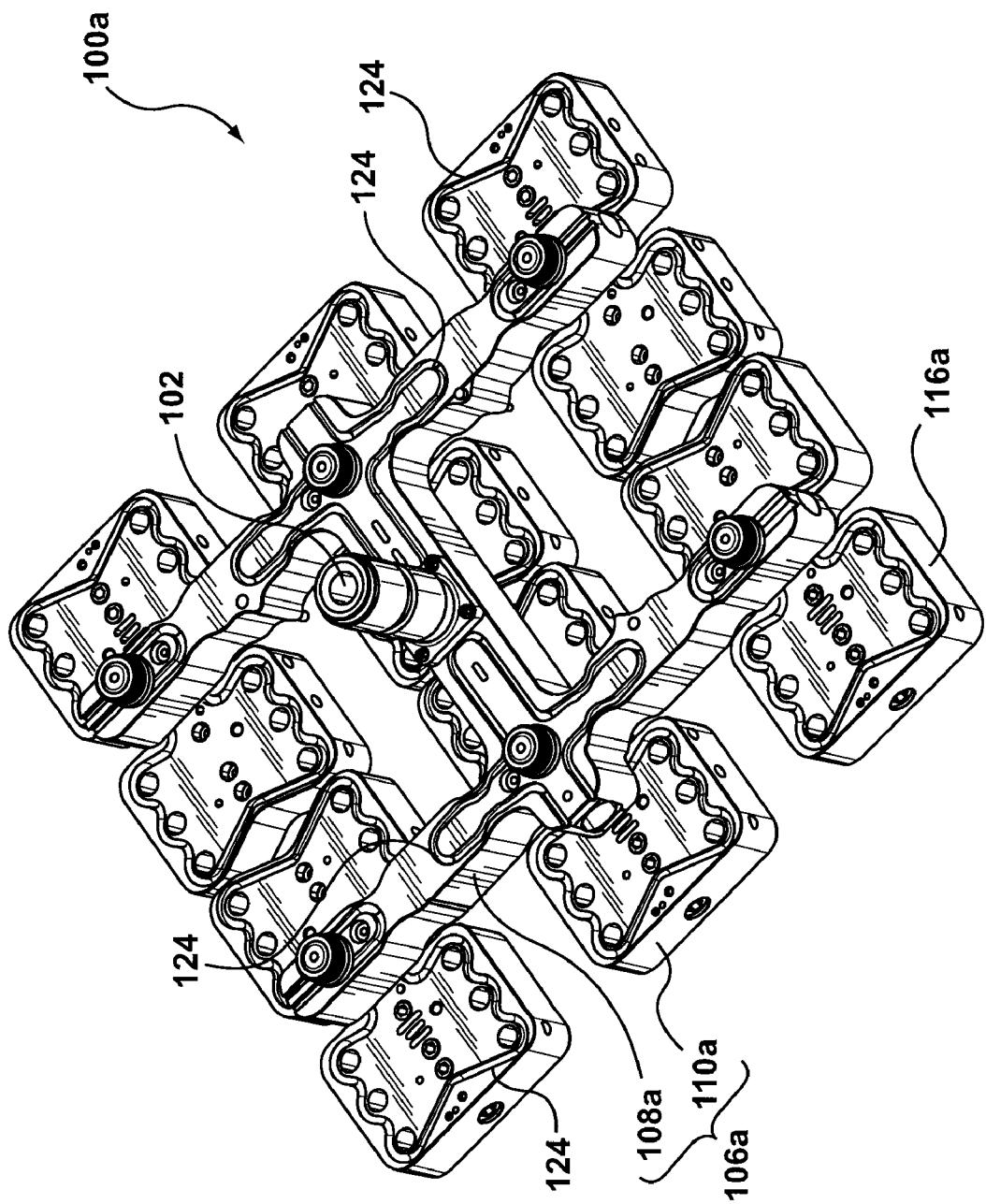
FIG. 3 depicts a perspective schematic view of a melt distribution network implemented according to another non-limiting embodiment of the present invention.
Figure 4:
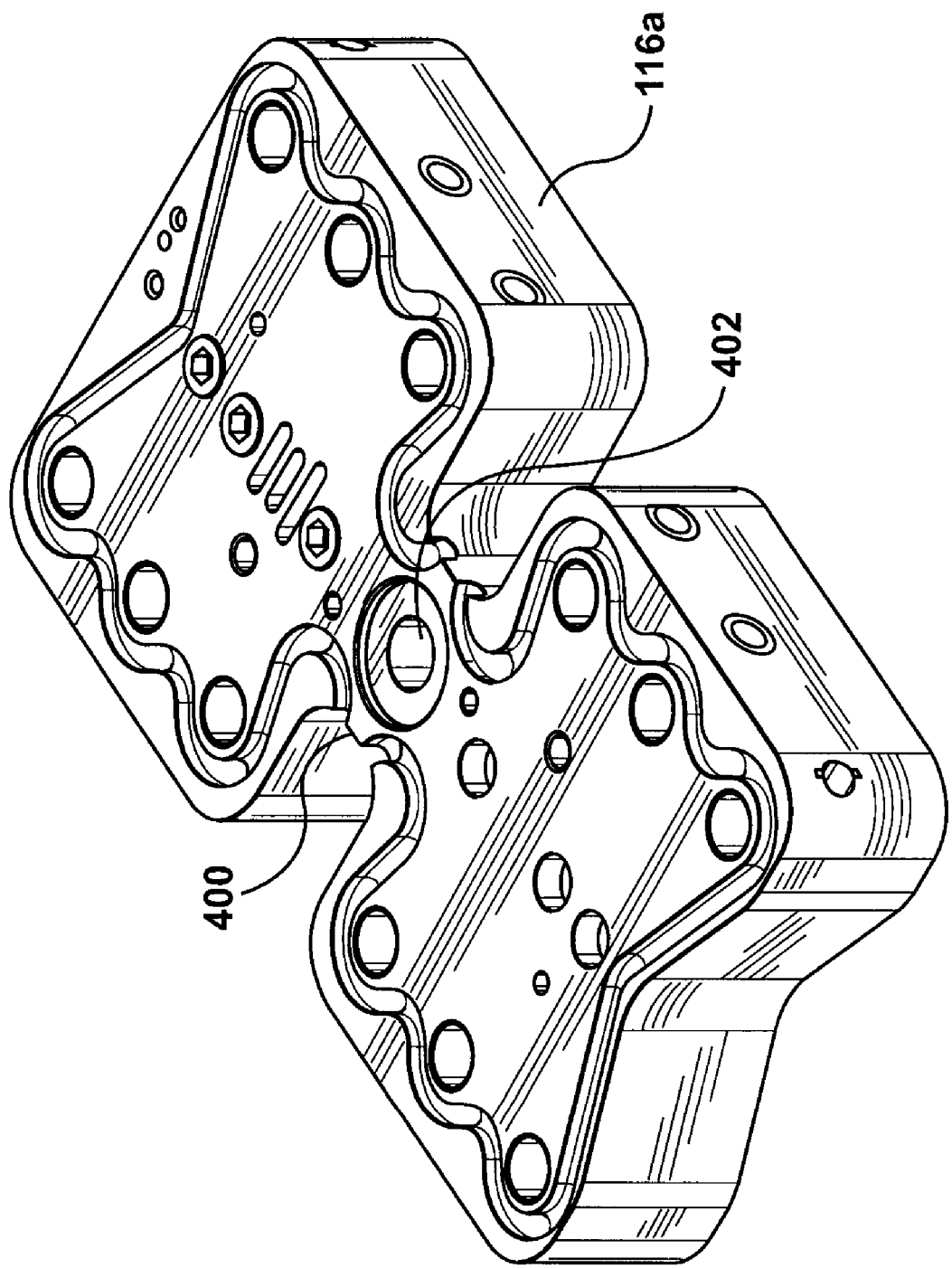
FIG. 4 depicts a second level distributor of FIG. 3 implemented in accordance with a non-limiting embodiment of the present invention.

With continued reference to FIG. 3 and with reference to FIG. 4, within these embodiments of the present invention, the second level sub-network 110a comprises six (6) instances of a second level distributor 116a. As is best seen in FIG. 4, the second level distributor 116a comprises two halves connected via a bridge 400. It can be appreciated that each of the halves of the second level distributor 116a is substantially similar to the second level distributor 116 of FIG. 1. As is shown in FIG. 4, the bridge 400 comprises a connector 402 via which the second level distributor 116a is coupled to the first level sub-network 108a.

Similarly to the melt distribution network 100 of FIG. 1, the melt distribution network 100a of FIG. 3 further comprises is a plurality of heater receptacles 124, only some of which are numbered in FIG. 3 for the sake of ease of illustration.

Those skilled in the art should appreciate that there exist further non-limiting embodiments as to how the melt distribution network 100, 100a may be implemented.

Figure 5:
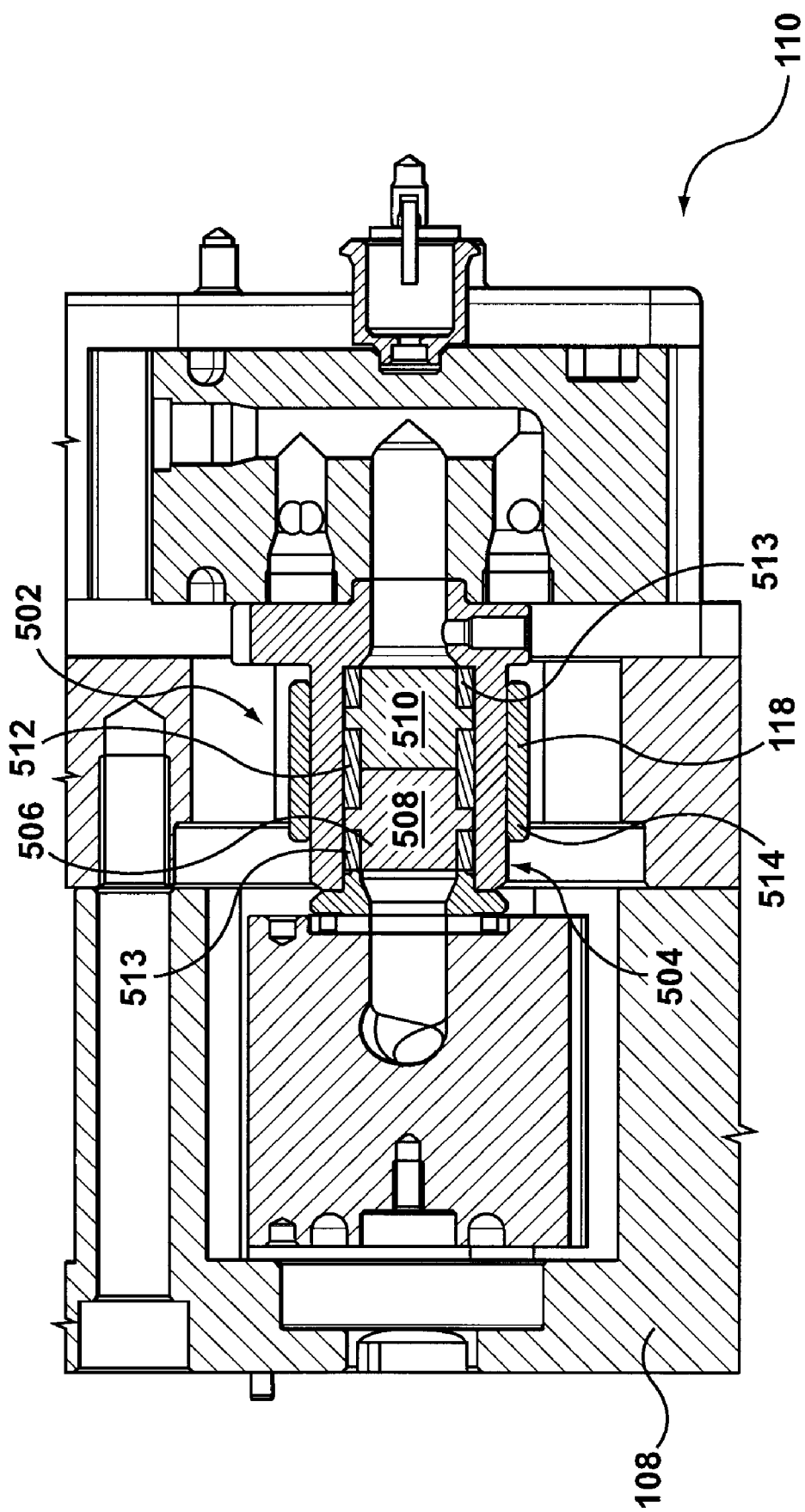
FIG. 5 is a cross section view of a coupler disposed between a first level sub-network and a second level sub-network of the melt distribution network of FIG. 1 and a control device disposed therein.

With reference to FIG. 5, there is provided a flow control device 502. In the specific non-limiting embodiment depicted in FIG. 5, the flow control device 502 is disposed in the coupler 118 located between the first level sub-network 108 and the second level sub-network 110. However, the placement of the flow control device 502 is not limited to the coupler 118. It should be expressly understood, that the flow control device 502 can be located in other parts of the melt distribution network 100, 100a. Some examples for the alternative placement of the flow control device 502 include, but are not limited to: (i) first level main distribution runner 202, (ii) the plurality of fluid connectors 204, (iii) the first level secondary distribution runner 206 and/or the coupling interface 208, (iv) the second level main distribution runner 240 and/or the coupling interface 241; (v) the fluid connector 242a and/or the fluid connector 242b, (vi) the second level secondary distribution runner 244 and/or the second level secondary distribution runner 246, (vii) the connector 402, as well as any other portion of the melt distribution network 100, 100a where the melt flow branches off in any direction. It should be expressly understood that other placements for the flow control device 502 are possible and will become apparent to those skilled in the art having benefit of teachings of embodiments of the present invention.

The flow control device 502 comprises a body 504, the body 504 configured to be positioned within a conduit that defines a path of flow for the melt (such as, for example, the coupler 118). The body 504 comprises a mixer 506. In the specific non-limiting embodiment of FIG. 5, the mixer 506 comprises a first mixer portion 508 and a second mixer portion 510 connected therebetween by a retainer 512 and coupled to the coupler 118 by retainers 513. It should be expressly understood that even though in the specific non-limiting embodiment of FIG. 5, the mixer 506 is depicted as comprising the first mixer portion 508 and the second mixer portion 510, the number of mixer portions (such as the mixer portion 508 and the second mixer portion 510) is not particularly limited. As such, in alternative embodiments, the mixer 508 may comprise a single mixer portion or more than two mixer portions.

Each of the first mixer portion 508 and the second mixer portion 510 can be implemented as a static mixer. An example of a static mixer is disclosed in a U.S. Pat. No. 7,198,400 issued to Unterlander et al. on Apr. 3, 2007 and which is assigned to the Assignee of the present application. However, other alternative implementations for the first mixer portion 508 and the second mixer portion 510 are possible. It can be said that each of the first mixer portion 508 and the second mixer portion 510 traverses substantially the whole cross-section of a melt path through which the melt is traveling, which in this case, is the melt path through the coupler 118.

The flow control device 502 further comprises a temperature control portion 514. In the specific non-limiting embodiment depicted in FIG. 5, the temperature control portion 514 is implemented as a band heater and spans the whole circumference of the body 504. In alternative non-limiting embodiments of the present invention, the temperature control portion 514 can be integral with the mixer 506.

The temperature control portion 514 comprises a control entity (not separately numbered) that can be in communication with and under control of the computing apparatus 180. The control entity of the temperature control portion 514 can be coupled to the computing apparatus 180 by means of a wireless connection, a wired connection or a combination thereof. The computing apparatus 180 can be configured to control a temperature setting associated with the temperature control portion 514 (i.e. to either increase or decrease the temperature setting) by transmitting a control signal to the control entity of the temperature control portion 514.

In some embodiments of the present invention, the temperature control portion 514 may further include a thermocouple or another sensor (for example, similar to the sensor 126) for determining and transmitting to the computing apparatus 180 an indication of an operating parameter.

By controlling the temperature setting of the temperature control portion 514, effectively, temperature of the first mixer portion 508 and the second mixer portion 510 can be controlled. As can be appreciated, by increasing the temperature setting associated with the temperature control portion 514 and by effectively increasing the temperature associated with the first mixer portion 508 and the second mixer portion 510, the rate of melt flow via the flow control device 502 is increased. By the same token, by decreasing the temperature setting associated with the temperature control portion 514 and by effectively decreasing the temperature associated with the first mixer portion 508 and the second mixer portion 510, the rate of melt flow via the flow control device 502 is decreased.

To summarize, by virtue of controlling the temperature setting associated with the flow control device 502, it is possible to actively control the rate of flow of the melt through a portion of the melt distribution network 100, 100a where the flow control device 502 is positioned. For the avoidance of doubt, it should be understood that the term "active control", as opposed to "passive control" is meant to denote a type of control where the temperature setting of the temperature control portion 514 can be controlled in both directions (i.e. increase and/or decrease the temperature setting) under control of, for example, the computing apparatus 180.

In the specific non-limiting embodiment being presented herein, the computing apparatus 180 can control melt distribution at the couplers 118 using the flow control device 502. The computing apparatus 180 can control the temperature by controlling each instance of the flow control device 502 based on a melt balance parameter. For example, if the melt balance parameter is indicative of a requirement to increase temperature, the computing apparatus 180 generates a control signal and transmits the control signal to the control device, the control signal being configured to cause the temperature control portion 514 to increase the temperature of the mixer 506 and, accordingly, of the melt flowing through the flow control device 502. Similarly, if the melt balance parameter is indicative of a requirement to decrease temperature, the computing apparatus generates a control signal and transmits the control signal to the control device, the control signal being configured to cause the temperature control portion 514 to decrease the temperature of the mixer 506 and, accordingly, of the melt flowing through the flow control device 502. How the melt balance parameter is determined is not particularly limited. For example, the computing apparatus 180 can compare rate of melt flow through all of the couplers 118 (for example, based on the parameter sensed by the sensor 126) and determine a respective melt balance parameter for each of the couplers 118 to ensure that melt flow rate through the couplers 118 is substantially even.

Even though the description presented above has used an example of the flow control device 502 being located in the coupler 118, the flow control device 502 can be located at any point upstream from the plurality of melt outlets 104.

A technical effect of embodiments of the present invention may include a more homogeneous melt distribution among the plurality of melt outlets 104. Another technical effect of embodiments of the present invention may include decreased time differential between a first filled and a last filled molding cavity. It should be understood that not all of these technical effects need to be recognized, in their entirety, in each and every embodiments of the present invention.

Description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described.

Therefore, what is to be protected by way of Letters Patent are limited only by the scope of the following claims:

1. A flow control device comprising:
    a body defining:
        a mixer configured to be positioned in a portion of a melt distribution network for providing a path of flow for melt such that the mixer traverses substantially the whole cross-section of the path of flow;
        a temperature control portion associated with the mixer for actively controlling temperature of the mixer; said temperature control portion being integral with said mixer;
    a control entity, being in communication and under control of a computing apparatus, when in use; the control entity being configured to control a temperature setting in both directions, under control of the computing apparatus, when in use.

2. The flow control device of claim 1, wherein said control entity of the temperature control portion is responsive to a control signal.

3. The flow control device of claim 1, wherein the portion of the melt distribution network is a coupler for fluidly connecting a first level sub-network and a second level sub-network of the melt distribution network.

4. The flow control device of claim 1, wherein the portion of the melt distribution network is a portion of the melt distribution network where melt flow branches off.

5. The flow control device of claim 1, wherein the portion of the melt distribution network is a portion of the melt distribution network selected from a list of:
    a first level main distribution runner;
    a plurality of fluid connectors;
    a first level secondary distribution runner;
    a coupling interface;
    a second level main distribution runner;
    a coupling interface;
    a fluid connector;
    a fluid connector (242b);
    a second level secondary distribution runner;
    a second level secondary distribution runner; and
    a connector.

6. The flow control device of claim 1, wherein said mixer comprises a first mixer portion and a second mixer portion coupled together by a retainer.

7. The flow control device of claim 1, wherein said mixer comprises at least one mixer portion.

8. A melt distribution network comprising:
    a network of runners for providing a path of flow between a melt inlet and a plurality of melt outlets;
    a flow control device disposed within a portion of the network of runners, the flow control device comprising a body defining:
        a mixer configured to be positioned within the portion of the network of runners such that the mixer traverses substantially the whole cross-section of the path of flow;
        a temperature control portion associated with the mixer for actively controlling temperature of the mixer;
        said temperature control portion being integral with said mixer;
        a control entity, being in communication and under control of a computing apparatus, when in use; the control entity being configured to control a temperature setting in both directions, under control of the computing apparatus, when in use.

9. The melt distribution network of claim 8, wherein the portion of the network of runners is located upstream from the plurality of melt outlets.

10. The melt distribution network of claim 8, wherein the portion of the network of runners is located upstream from the plurality of melt outlets and downstream from the melt inlet.

11. The melt distribution network of claim 8, wherein said control entity of the temperature control portion is responsive to a control signal.

12. The melt distribution network of claim 8, wherein said temperature control portion is integral with said mixer.

13. The melt distribution network of claim 8, wherein the portion of the network of runners is a coupler for fluidly connecting a first level sub-network and a second level sub-network of the melt distribution network.

14. The melt distribution network of claim 8, wherein the portion of the network of runners is a connector for fluidly connecting a first level sub-network and a second level sub-network of the melt distribution network.

15. The melt distribution network of claim 8, wherein the portion of the network of runners is a portion of the melt distribution network where melt flow branches off.

16. The melt distribution network of claim 8, wherein the portion of the network of runners is a portion of the melt distribution network selected from a list of:
 a first level main distribution runner;
 a plurality of fluid connectors;
 a first level secondary distribution runner;
 a coupling interface;
 a second level main distribution runner;
 a coupling interface;
 a fluid connector;
 a fluid connector;
 a second level secondary distribution runner;
 a second level secondary distribution runner; and
 a connector.

17. The melt distribution network of claim 8, wherein said mixer comprises a first mixer portion and a second mixer portion coupled together by a retainer.

18. The melt distribution network of claim 8, wherein said mixer comprises at least one mixer portion.

* * * * *